(12) United States Patent
Pasupathy et al.

(10) Patent No.: US 10,824,462 B2
(45) Date of Patent: Nov. 3, 2020

(54) METHODS AND SYSTEMS FOR PROVIDING CLOUD BASED MICRO-SERVICES

(71) Applicant: NETAPP, INC., Sunnyvale, CA (US)

(72) Inventors: Shankar Pasupathy, Milpitas, CA (US); Maneesh Abraham, Sunnyvale, CA (US); William Earl Taylor, Jr., Bahama, NC (US)

(73) Assignee: NETAPP, INC., Sunnyvale, CA (US)

( * ) Notice: Subject to any disclaimer, the term of this patent is extended or adjusted under 35 U.S.C. 154(b) by 84 days.

(21) Appl. No.: 16/358,298

(22) Filed: Mar. 19, 2019

(65) Prior Publication Data
US 2020/0159557 A1 May 21, 2020

Related U.S. Application Data

(60) Provisional application No. 62/767,897, filed on Nov. 15, 2018.

(51) Int. Cl.
*G06F 9/455* (2018.01)
*H04L 29/08* (2006.01)
*G06F 9/451* (2018.01)

(52) U.S. Cl.
CPC .......... *G06F 9/45558* (2013.01); *G06F 9/451* (2018.02); *H04L 67/1097* (2013.01); *G06F 2009/4557* (2013.01)

(58) Field of Classification Search
CPC . H04L 67/10; H04L 67/1097; G06F 9/45558; G06F 8/60; G06F 9/455; G06F 9/451; G06F 9/45533
See application file for complete search history.

(56) References Cited

U.S. PATENT DOCUMENTS

| | | | |
|---|---|---|---|
| 2017/0168664 A1* | 6/2017 | Kashyap | G06T 11/206 |
| 2018/0027079 A1* | 1/2018 | Ben Ali | H04L 67/16 |
| | | | 709/216 |
| 2018/0041336 A1* | 2/2018 | Keshava | G06F 21/33 |
| 2018/0159747 A1* | 6/2018 | Chang | H04L 41/5045 |
| 2018/0288094 A1* | 10/2018 | Ahuja | H04L 41/0893 |
| 2018/0352033 A1* | 12/2018 | Pacella | H04L 67/10 |

* cited by examiner

*Primary Examiner* — Tuan C Dao
(74) *Attorney, Agent, or Firm* — Klein, O'Neill & Singh, LLP (57) ABSTRACT

Methods and systems for a networked computing system are provided. One method includes deploying a micro-service associated with data stored by a networked storage system at a storage device, the micro-service deployed as a virtual machine of a cloud-based system having a data store, and an application programming interface (API) for providing analytic information associated with the data and resources of the networked storage system, where the cloud based system is accessible to a client system via a first network connection; processing performance data associated with the micro-service by a first computing system; storing the processed performance data for the micro-service at a storage volume accessible via a second network connection; copying the processed performance data at the data store by a data loader; and providing access to the processed performance data to the client system from the data store via the API and the first network connection.

20 Claims, 8 Drawing Sheets

METHODS AND SYSTEMS FOR PROVIDING CLOUD BASED MICRO-SERVICES

CROSS-REFERENCE TO RELATED APPLICATIONS

This patent application claims priority under 35 U.S.C. § 119(e) over U.S. provisional patent application, Ser. No. 62/767,897, filed on Nov. 15, 2018, entitled "Methods and Systems for Providing Cloud Based Micro-services", the disclosure of which is incorporated herein in it entirety.

TECHNICAL FIELD

The present disclosure relates to computing technology for storage systems, and more particularly, to providing storage related micro-services (or microservices) via a cloud based system.

BACKGROUND

Various forms of storage systems are used today. These forms include direct attached storage (DAS) network attached storage (NAS) systems, storage area networks (SANs), and others. Networked storage systems are commonly used for a variety of purposes, such as providing multiple clients with access to shared data, backing up data and others.

A storage system typically includes at least one computing system executing a storage operating system for storing and retrieving data on behalf of one or more client computing systems ("clients"). The storage operating system typically stores and manages shared data containers in a set of mass storage devices.

Storage systems are used in virtual environments where a physical resource is time-shared among a plurality of independently operating processor executable virtual machines. Cloud computing with virtual machines also continues to grow in popularity.

To manage storage systems and data centers, telemetry data (for example, latency, utilization, number of input output operations per second (IOPS), or any other performance related information) is collected from different networked storage systems. An example of a support infrastructure for collecting and processing telemetry data is "AUTOSUPPORT" provided by NetApp Inc., the assignee of this application. Processing the telemetry data and then making the processed data available via application programming interface ("API"), for example, REST (representational state transfer) APIs is a challenging and time-consuming task. This has typically been done within an enterprise by deploying expensive, "on premise" hardware and software systems. In addition, conventional methods for consuming transformed telemetry data and making it available via a user interface ("UI") and API is based on using a relational databases and traditional web services architecture. This makes it difficult to rapidly introduce new services (or micro-services) and applications for clients via the cloud.

Traditional architectures for storage management systems are built as set of monolithic tiers. For example, with "MyASUP" (a portal provided to customers by NetApp Inc.), incoming telemetry data collected by AUTOSUPPORT is processed and stored in databases. MyASUP then uses REST APIs from a middleware tier, to gather data and to display the data within a UI. This can be challenging because the monolithic architectures are difficult to modify quickly without affecting the rest of the system. For example, if one wants to add a new type of performance graph, one will need to modify an ETL (extract, transform and load) code pipeline to add a new data set to one of several databases. The monolithic middleware layer and the monolithic UI will also have to be modified. This necessitates re-testing an entire software management stack used by a networked storage system. Continuous efforts are being made to develop technology for efficient cloud-based solutions providing data analytics services for a networked storage environment.

BRIEF DESCRIPTION OF THE DRAWINGS

The various features of the present disclosure will now be described with reference to the drawings of the various aspects disclosed herein. In the drawings, the same components may have the same reference numerals. The illustrated aspects are intended to illustrate, but not to limit the present disclosure. The drawings include the following Figures.

DETAILED DESCRIPTION

As a preliminary note, the terms "component", "module", "system," and the like as used herein are intended to refer to a computer-related entity, either software-executing general purpose processor, hardware, firmware and a combination thereof. For example, a component may be, but is not limited to being, a process running on a hardware-based processor, a hardware processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various non-transitory, computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device, in accordance with the claimed subject matter.

Figure 1:
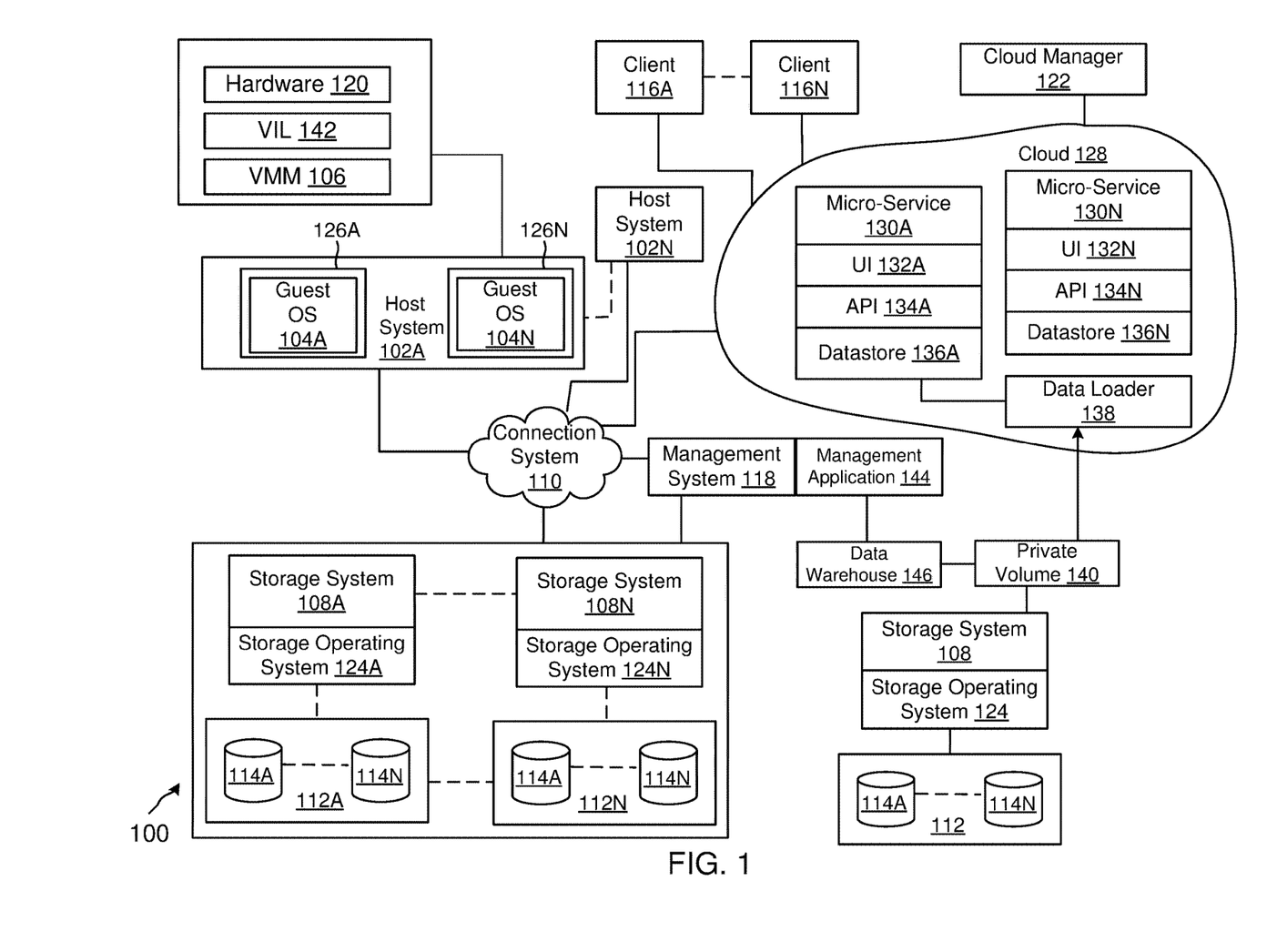
FIG. 1 shows an example of an operating environment for the various aspects disclosed herein.

System 100:

FIG. 1 shows an example of a system 100, for presenting micro-services (or microservices, used interchangeably) via a cloud-based system (or "cloud") 128, according to one aspect of the present disclosure. Cloud 128 provides an abstraction between computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to a network, for example, the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud. After the application layer, is a cloud platform and cloud infrastructure, followed by a "server" layer that includes hardware and computer software designed for cloud specific services.

In one aspect, a cloud manager system 122 manages access to cloud based services for client devices (or "clients") 116A-116N that are able to access a plurality of micro-services 130A-130N (may also be referred to as a "micro-service 130" or micro-services 130), described below in detail. Each micro-service 130 includes a User Interface (UI) (e.g. 132A-132N), an application programming interface ("API") (134A-134N) and a data store (may also be referred to as a database) (e.g. 136A-136N) specifically configured for the specific micro-service. The term micro-service as used herein denotes computing technology for providing a specific functionality in the networked storage environment. As an example, a micro-service may provide analytic information to clients 116 regarding data stored by system 100, and performance and utilization of resources used by system 100. Details regarding micro-services are provided below.

System 100 includes a plurality of storage systems 108 (e.g. 108A-108N) that may be used at one or more physical sites. A management system 118 executing an application 144 interfaces with the various storage systems 108A-108N and collects telemetry data from the various resources. An example of a management system 118 is "AUTOSUPPORT" provided by NetApp Inc. The collected data is processed by the management system 118 and may be stored at a data warehouse 146, described below in detail. Processed data specific to a micro-service is also stored at a private volume (may also be referred to as a volume) 140 managed by a storage system 108. The term private in this context means that the volume is not accessed directly by the clients' 116, instead the processed data from the volume 140 is accessed by a data loader 138, on-demand for consumption by the individual micro-services, as described below in more detail.

In one aspect, the data loader 138 detects an update to the private volume 140 from the data warehouse 146. The data loader 138 then copies the data at the data store 136 for the micro-service using a network connection. The data may be stored using a SQL or a non-SQL database (e.g. a "MongoDB" database). Data from the data store 136 is then read by API 134, for example, a REST API. The UI 132 accesses the API 134 and displays the data via a browser.

In one aspect, system 100 may include a plurality of computing systems 102A-102N (may also be referred to as host platform(s)/system(s) 102 or simply as server(s) 102) communicably coupled to storage system 108A-108N executing a storage operating system 124 via a connection system 110 such as a local area network (LAN), wide area network (WAN), the Internet and others. As described herein, the term "communicably coupled" may refer to a direct connection, a network connection, or other connections to enable communication between devices. It is noteworthy that although connection system 110 and cloud 128 are shown as separate entities, functionally, the two systems may be similar in terms of providing access to host systems i.e. the host systems may access the storage systems via cloud 128.

Host system 102A may include a VM environment where a plurality of VMs 126A-126N are executed and presented to client computing devices/systems 116A-116N. VMs 126A-126N execute a plurality of guest OS 104A-104N (may also be referred to as guest OS 104) that share hardware resources 120.

Typically, in a virtual machine environment a physical resource is time-shared among a plurality of independently operating processor executable VMs. Each VM 126 may function as a self-contained platform, running its own operating system (OS) and computer executable, application software. The computer executable instructions running in a VM may be collectively referred to herein as "guest software" [shown as 104A-104N). In addition, resources available within the VM may be referred to herein as "guest resources."

The guest software expects to operate as if it were running on a dedicated computer rather than in a VM. That is, the guest software expects to control various events and have access to hardware resources 120 on a physical computing system (may also be referred to as a host platform/system). The host hardware resource 120 may include one or more processors, resources resident on the processors (e.g., control registers, caches and others), memory (instructions residing in memory, e.g., descriptor tables), and other resources (e.g., input/output devices, host attached storage, network attached storage or other like storage) that reside in a physical machine or are coupled to the host system.

In one aspect, host system 102A includes or interfaces with a virtual machine monitor (VMM) 106, for example, a processor executed Hyper-V layer provided by Microsoft Corporation of Redmond, Wash., a hypervisor layer provided by VMWare Inc., or any other type. VMM 106 manages the plurality of guest OS 104A-104N executed by the host system 102A. The VMM 106 may include or interface with a virtualization layer (VIL) 142 that provides one or more virtualized hardware resource 120 to each OS 104A-104N.

In one aspect, VMM 106 is executed by the host system 102A with VMs 126A-126N. In another aspect, VMM 106 may be executed by an independent stand-alone computing system, often referred to as a hypervisor server or VMM server and VMs 126A-126N are presented at one or more host computing systems.

It is noteworthy that different vendors provide different virtualization environments, for example, VMware Corporation, Microsoft Corporation and others. Data centers may have hybrid virtualization environments/technologies, for example, Hyper-V and hypervisor based virtual environment. The generic virtualization environment described above with respect to FIG. 1 may be customized depending on the virtual environment to implement the aspects of the present disclosure. Furthermore, VMM 106 (or VIL 142) may execute other modules, for example, a storage driver, network interface and others, the details of which are not germane to the aspects described herein and hence have not been described in detail.

In one aspect, the management system 118 may also be used for managing and configuring various elements of system 100. Application 144 may be used to manage and configure VMs as well as configure resources that are used by VMs, according to one aspect.

It is noteworthy that although a single management system 118 is shown in FIG. 1, system 100 may include other management devices for performing different functions, for example, managing storage systems, managing network connections and other functions. The innovative aspects described herein are not limited to any specific number of management systems.

In one aspect, storage system 108 has access to a set of mass storage devices 114A-114N (may also be referred to as storage devices 114) within at least one storage subsystem 112. The mass storage devices 114 may include writable storage device media such as magnetic disks, video tape, optical, DVD, magnetic tape, non-volatile memory devices for example, solid state drives (SSDs) including self-encrypting drives, flash memory devices and any other similar media adapted to store information. The storage devices 114 may be organized as one or more groups of Redundant Array of Independent (or Inexpensive) Disks (RAID). The various aspects disclosed are not limited to any particular storage device type or storage device configuration.

In one aspect, the storage system 108 provides a set of logical storage volumes (or logical unit numbers (LUNs) for a storage area network (SAN)) for storing and retrieving data. Each volume (e.g. 140) may be configured to store data files (or data containers or data objects), scripts, word processing documents, executable programs, and any other type of structured or unstructured data. From the perspective of one of the client systems, each volume can appear to be a single drive. However, each volume can represent storage space in at one storage device, an aggregate of some or all of the storage space in multiple storage devices, a RAID group, or any other suitable set of storage space.

The storage operating system 124 (or 124A-124N) organizes storage space at storage devices 114 as one or more "aggregate", where each aggregate is identified by a unique identifier and a location. Within each aggregate, one or more storage volumes are created whose size can be varied. A qtree, sub-volume unit may also be created within the storage volumes. As a special case, a qtree may be an entire storage volume.

The storage system 108 may be used to store and manage information at storage devices 114 based on client requests. The requests may be based on file-based access protocols, for example, the Common Internet File System (CIFS) protocol or Network File System (NFS) protocol, over the Transmission Control Protocol/Internet Protocol (TCP/IP). Alternatively, the request may use block-based access protocols, for example, the Small Computer Systems Interface (SCSI) protocol encapsulated over TCP (iSCSI) and SCSI encapsulated over Fibre Channel (FCP). The adaptive aspects described herein are not limited to any specific request type or request protocol.

In a typical mode of operation, a client (for example, a VM) transmits one or more input/output (I/O) requests, such as a CFS or NFS request, over connection system 110 to the storage system 108. Storage system 108 receives the requests, and issues one or more I/O commands to storage devices 114 to read or write the data on behalf of the client system, and issues a CIFS or NFS response containing the requested data over the network 110 to the respective client system.

FIG. 1 provides an example of a micro-services architecture that enables building complex micro-services applications (130A-130N) by decomposing them into a set of independent and loosely coupled services. Each service (typically running as one or more operating system processes) provides a specific capability or function, and communicates with the other services over a network. Microservices of the present disclosure are modular, lightweight, and isolated. Each Microservices 130 can be developed independently and updated or replaced as needed. As an example, a micro-service may be deployed as a container (e.g. a "Docker" container described below), is stateless in nature, may be exposed as a REST API and is discoverable by other services.

The following provides a brief definition of various technologies used for developing and deploying micro-services 130A-130N:

"Docker": Docker is a software framework for building and running micro-services using the Linux kernel (without derogation of any third party trademark rights). The various aspects described herein are not limited to the Linux kernel. In one aspect, Docker micro-service code for applications 130A-130N is packaged as a "Docker image file". A Docker container is then initialized using an associated image file. A Docker container is an active or running instantiation of a Docker image. Each Docker container provides isolation and resembles a lightweight VM. However, Docker can be used without the overhead of VMM 106. It is noteworthy that many Docker containers can run simultaneously in a same Linux computing system.

Cloud 128 may be based on the Amazon Web Services (AWS) (without derogation of any trademark rights). However, the adaptive aspects may be implemented using other cloud platforms. AWS provides a collection of on-demand public cloud services in different categories, including: compute, storage, and database services.

Cloud 128 may also leverage an "AWS Elastic Compute Cloud" that may also be referred to as "AWS EC2", a service providing scalable compute capacity in the AWS cloud. Each VM in AWS EC2 is packaged and deployed as an Amazon Machine Image (AMI) file.

In one aspect, cloud 128 may include the use of an AWS Virtual Private Cloud (VPC), a service that enables configuration of a logically isolated section of the AWS cloud to simulate a datacenter private cloud.

In one aspect, management system 118 may use Hadoop, an implementation of a "MapReduce" algorithm written primarily in Java for processing data collected from the storage systems 128. Hadoop enables processing large, distributed datasets. The management application 144 may use "Hive" that is built on top of Hadoop and provides a data warehouse capability through a SQL-like query language for each micro-service. Hive supports analysis of data stored using Hadoop Distributed File System (HDFS).

The private volume 140 may be a "NetApp Private Storage (NPS) provided by a NetApp FAS or FlexArray™ storage system (or controller) (e.g. storage system 108) which may also be referenced as an "Equinix" data center. The storage system 108 is connected to the AWS cloud compute environment, as well as other service providers, through a network connection.

In one aspect, management system 118 maintains processed data at the data warehouse 146. The data warehouse is a repository for all data collected storage systems 108A-108N. The data warehouse may include a secondary repository, referred to as "DataLake" that is based on Hadoop and HDFS. Data is replicated from the data warehouse to DataLake.

In one aspect, management system 188 executes a DataLake Gateway Server (DGS) as a VM to run batch jobs against a Hadoop cluster. This provides an interface between the data in DataLake and the private volume 140.

In one aspect, storage system data, e.g., performance and utilization data is collected from various deployed storage systems, including capacity statistics for aggregates used by storage controllers, latency data, service times, wait times, IOPS or any other data type. A MapReduce job is run by the data warehouse 146 and written to the private volume 140.

In one aspect, "Node.js" may be used as a "JavaScript" runtime environment for developing the micro-services. AngularJS may be used as a development framework for front-end web applications using Javascript. Code development for each micro-service may be controlled using Git repositories. It is noteworthy that these enabling technology examples are simply an illustration. The adaptive aspects of the present disclosure may be implemented using other technologies.

As mentioned above, a micro-service may have a plurality of containers, for example, an optional UI component 130, an API component 132 and a specific data store 136 that stores micro-service related data. The data store 136 operates as a caching layer for the data stored in private volume 140 that can be customized based on a service type. For example, a service involving performance data may use a database best suited for numbers and time-series data such as "InfluxDB", and if the information stored is small and simple, the data store 136 operates as an in-memory buffer.

Once the data is cached within the data store 136, it can be accessed via the API 136. In one aspect, the micro-service 130 provides the optional UI component 132 to provide a consistent view for various micro-services. To achieve this, UIs are implemented as components that can be easily pulled into a master UI portal. Stylesheets are defined for UI components to have a common look and feel across different services.

In one aspect, system 100 provides rapid provisioning of new analytics services, at low cost, and with user interfaces that are mobile friendly are implemented. In addition, analytics services via micro-services 130A-130N provide APIs that can easily be consumed by other services or external customers. Clients can also deploy an analytics service based on client needs and without affecting the quality of other services.

In one aspect, the micro-services platform of the present disclosure may be used to provide a capacity prediction service via the cloud 128. For a given storage system and an aggregate, this micro-service predicts a number of days to an aggregate becoming full, for example, 85% full. The micro-service provides a UI that helps a user visualize storage capacity growth.

Similar to the capacity prediction service, a performance headroom prediction service that predicts available performance capacity of resources used by storage systems at any time. This enables a storage system to better use resources and when the storage system reaches performance limits, the system can be upgraded. Details regarding headroom determination are provided in U.S. patent application Ser. No. 14/994,009, filed on Jul. 12, 2016, entitled "METHODS AND SYSTEMS FOR DETERMINING PERFORMANCE CAPACITY OF A RESOURCE OF A NETWORKED STORAGE ENVIRONMENT", the disclosure of which are incorporated herein by reference in its entirety.

In one aspect, system 100 provides a platform for building and deploying custom data analytic services via the cloud for managing storage systems. The solution is flexible and extensible, lightweight, rapidly developed, low cost, and adheres to industry standards.

In one aspect, the micro-services 130 deployment model is based on a single silo approach i.e. each micro-service exists independent of any another service, e.g. micro-service 130A is independent of micro-service 130N. However, different micro-services can be grouped together into a single module, so that they can share certain common resources, e.g. common data.

In one aspect, each micro-service 130 may exist as an isolated repository, e.g. a local "Git" repository. Git provides technology for developing software code. Git stores data in a data structure called a repository that includes "committed" objects and references to committed objects, called "heads." When a micro-service is ready to be deployed, the local Git repository is pushed to a remote repository for ongoing source code management.

In one aspect, different micro-services share common repositories and resources. For example, the data warehouse 146 component and the data loader 138.

In one aspect, the data warehouse 146 includes a gateway server to access data from a Hadoop cluster. The data warehouse 146 executes a data warehouse component, for example, a DataLake component, which is a script and other supporting software that sequences Hive queries to generate an output file. The script also exports output files to the private volume 140 for consumption by the other service components.

In one aspect, each micro-service 130 has its own unique microservices code, which is deployed as several "Docker" containers in a virtual machine. The code for each service can be derived from the samples in the repository. As an example, each service uses a dedicated AWS EC2 virtual machine.

Although storage system 108 is shown as a stand-alone system, i.e. a non-cluster based system, in another aspect, storage system 108 may have a distributed architecture; for example, a cluster based system that is described below in detail with respect to FIGS. 2A-2B.

Figure 2A:
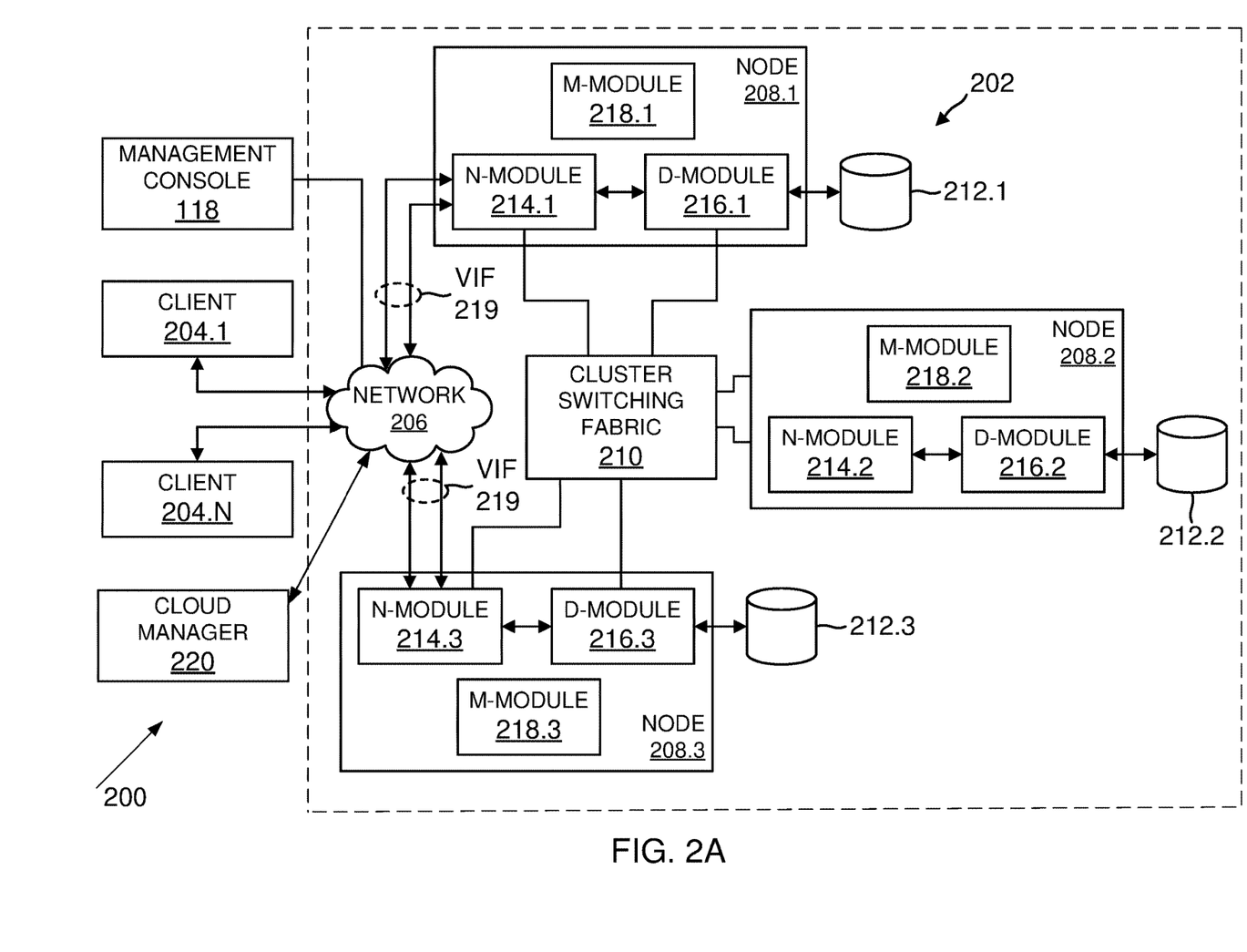
FIG. 2A shows an example of a networked, clustered storage system, used according to one aspect of the present disclosure.

Clustered System:

FIG. 2A shows a cluster based storage environment 200 having a plurality of nodes for managing storage devices and providing micro-services via a cloud computing environment, managed by a cloud manager 220 (similar to 122, FIG. 1), according to one aspect. Storage environment 200 may include a plurality of client systems 204.1-204.N (similar to 116A-116N), a clustered storage system 202 (similar to storage system 108), management system 118 and at least a network 206 communicably connecting the client systems 204.1-204.N and the clustered storage system 202. The cloud manager 220 interfaces with clients and the storage systems via a network connection.

The clustered storage system 202 includes a plurality of nodes 208.1-208.3, a cluster switching fabric 210, and a plurality of mass storage devices 212.1-212.3 (may also be referred to as 212 and similar to storage device 114). Each of the plurality of nodes 208.1-208.3 is configured to include a network module (N-module), a storage module (a D-module), and a management module (M-module), each of which can be implemented as a processor executable module. As an example, node 208.1 includes an N-module 214.1, a D-module 216.1, and an M-Module 218.1, node 208.2 includes an N-module 214.2, a D-module 216.2, and an M-Module 218.2, and node 208.3 includes an N-module 214.3, a D-module 216.3, and an M-Module 218.3.

The N-modules 214.1-214.3 include functionality that enable the respective nodes 208.1-208.3 to connect to one or more of the client systems 204.1-204.N over the computer network 206. The N-modules handle file network protocol processing (for example, CFS, NFS and/or iSCSI requests). The D-modules 216.1-216.3 connect to one or more of the storage devices 212.1-212.3 and process I/O requests. Accordingly, each of the plurality of nodes 208.1-208.3 in the clustered storage server arrangement provides the functionality of a storage server.

The M-Modules 218.1-218.3 provide management functions for the clustered storage system 202. The M-Modules 218.1-218.3 collect information regarding storage devices 212 and makes it available management system 118. The information may include latency information, capacity utilization, available performance capacity data or any other information.

A switched virtualization layer including a plurality of virtual interfaces (VIFs) 219 is provided to interface between the respective N-modules 214.1-214.3 and the client systems 204.1-204.N, allowing storage 212.1-212.3 associated with the nodes 208.1-208.3 to be presented to the client systems 204.1-204.N as a single shared storage pool.

The clustered storage system 202 can be organized into any suitable number of virtual servers (may also be referred to as "VServers" or virtual storage machines), in which each VServer represents a single storage system namespace with separate network access. Each VServer has a specific client domain and a security domain that are separate from the client and security domains of other VServers. Moreover, each VServer is associated with one or more VIFs 219 and can span one or more physical nodes, each of which can hold one or more VIFs and storage associated with one or more VServers. Client systems 204 can access the data on a VServer from any node of the clustered system, through the VIFs associated with that VServer. It is noteworthy that the aspects described herein are not limited to the use of VServers.

Each of the nodes 208.1-208.3 is defined as a computing system to provide application services to one or more of the client systems 204.1-204.N. The nodes 208.1-208.3 are interconnected by the switching fabric 210, which, for example, may be embodied as an Ethernet switch or any other type of switch/connecting device.

Although FIG. 2A depicts an equal number (i.e., 3) of the N-modules 214.1-214.3, the D-modules 216.1-216.3, and the M-Modules 218.1-218.3, any other suitable number of N-modules, D-modules, and M-Modules may be provided. There may also be different numbers of N-modules, D-modules, and/or M-Modules within the clustered storage system 202. For example, in alternative aspects, the clustered storage system 202 may include a plurality of N-modules and a plurality of D-modules interconnected in a configuration that does not reflect a one-to-one correspondence between the N-modules and D-modules. In another aspect, the clustered storage system 202 may only include one N-module and D-module.

Each client system 204.1-204.N may request the services of one of the respective nodes 208.1, 208.2, 208.3, and that node may return the results of the services requested by the client system by exchanging packets over the computer network 206, which may be wire-based, optical fiber, wireless, or any other suitable combination thereof.

Figure 2B:
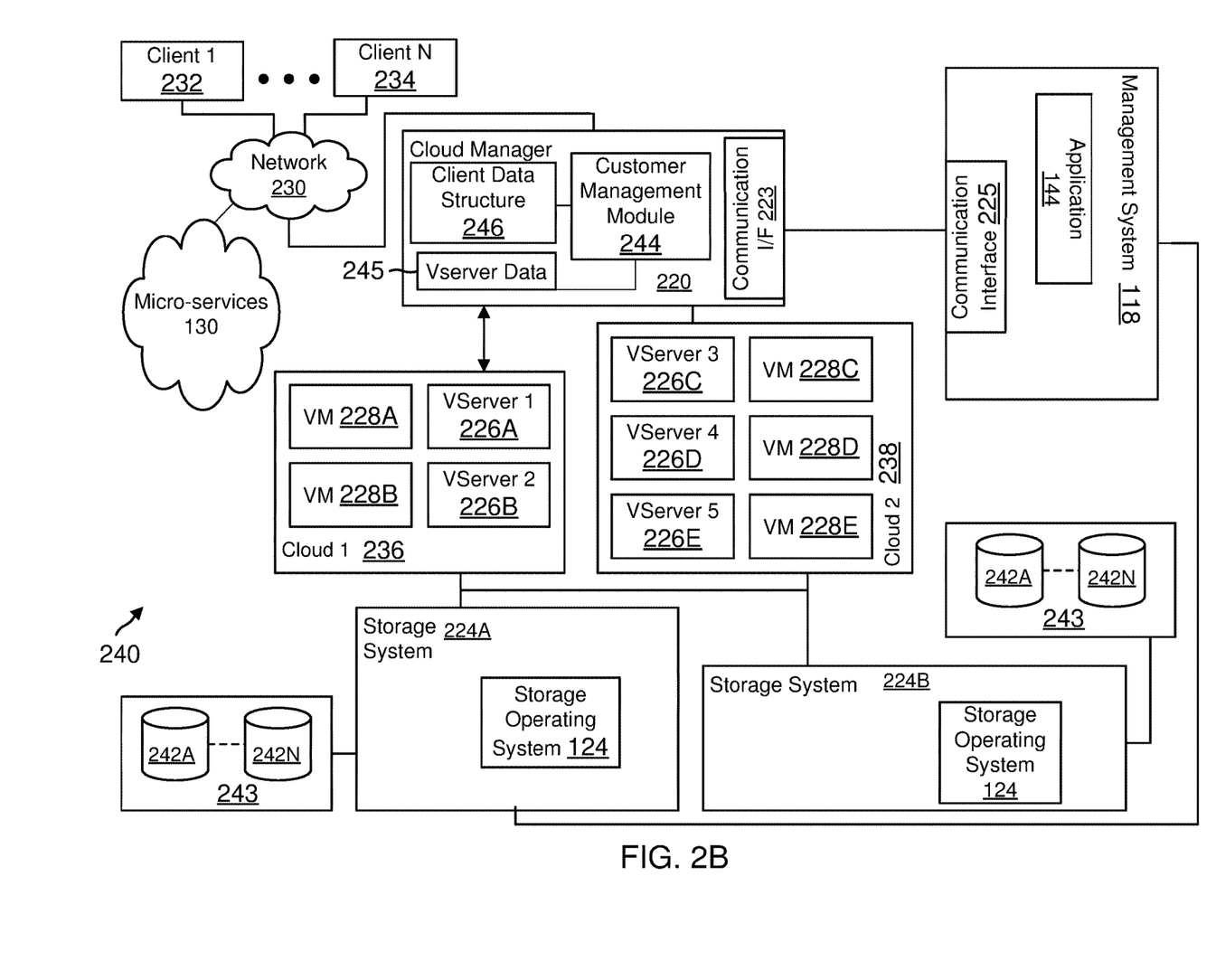
FIG. 2B shows an example of a networked storage system in a cloud computing environment, according to one aspect of the present disclosure.

Cloud Environment:

FIG. 2B shows one or more storage systems (224A/224B) analogous to storage system 108/202 for providing storage services in a cloud-based environment 240 (similar to 128, FIG. 1), according to one aspect of the present disclosure. In one aspect, cloud environment 240 may be a computing environment configured to enable network access (e.g., on-demand access) to a shared pool of configurable computing resources (e.g., networks, storage, host servers, applications, and services). The cloud environment 240 also provided micro-services 130 to client systems, as described above with respect to FIG. 1. In one or more aspects, a storage system may be a hardware resource configured to host one or more VServers in the cloud environment 240.

Storage system 224A and storage system 224B may be deployed by the cloud manager 220 (similar to 122, FIG. 1) and/or a cloud administrator configured to provision the host systems, storage associated with one or more client devices (e.g., client 1 232, client N 234) and/or services requested by the one or more client devices based on various policies that are customized for different clients and applications. As an example, storage system 224A may be configured to be associated with VServer 1 226A and VServer 3 226C, while storage system 224B may be configured to be associated with VServer 2 226B, VServer 4 226D and VServer 5 226E.

In one or more aspects, cloud manager 220 may enable one or more client devices to provision computing resources thereof. The cloud manager 220 may manage cloud portion(s) (e.g., cloud 1 236, cloud 2 238) associated with client 1 232 and client N 234, respectively. The cloud manager 220 also communicates with the management system 118 using communication interface 223, while the management system 118 uses communication interface 225.

In one aspect, the cloud manager 220 maintains client information using a client data structure 246. The client data structure 246 identifies a client and the various service that are available for client systems. A customer management module 244 may provide APIs for receiving instructions to add, modify or delete client information.

The cloud manager 220 also maintains VServer data 245 includes a listing of VServers that are assigned to each client/VM. It is noteworthy that each cloud may have its own storage administrator that may store VServer data 245. The various aspects described herein are not limited to which entity maintains and updates VServer data.

Client 1 232 and/or client N 234 may log into a system associated with cloud manager 220 to access cloud 1 236 and/or cloud 2 238 (and the VMs 228A-228E therein) through a public network 230 (e.g., Internet). The client devices and/or VMs associated therewith provided in cloud environment 240 may be analogous to the clients of FIGS. 1/2A.

In order to address storage requirements/requests associated with client 1 232 and client N 234, cloud manager 220 may be configured to appropriately provision VServer 1 226A, VServer 2 226B, VServer 3 226C, VServer 4 226D and VServer 5 226E and then allocate the appropriate VServer to client 1 232 and client N 234. The aforementioned VServers may be virtualized entities utilized by client 1 232 and client N 234 to meet storage requirements thereof. Multi-tenancy may allow for a storage system to have multiple VServers associated therewith. A portion of the cloud (e.g., cloud 1 236) including VServer 1 226A, VServer 2 226B and virtual machines (e.g., VM 228A, VM 228B) associated therewith, may be associated with client 1 232, and a portion of the cloud (e.g., cloud 2 238) including VServer 3 226C, VServer 4 226D and VServer 5 226E and VMs (e.g., VM 228C, VM 228D, VM 228E) associated therewith, may be associated with client N 234.

The aforementioned cloud portions may be logical subsets of the cloud and may include VMs implemented with operating systems (e.g., Linux, Microsoft®'s Windows®). "Cloud" as used herein may refer to the large pool of configurable computing resources (e.g., virtualized computing resources) that may be subjected to a pay-per-use model, in which client(s) may enter into service agreement(s) with service provider(s). The portion of the "cloud," therefore, may refer to the pool of resources associated with a particular client. It is noteworthy that client 1 232 and/or client N 234 may be entities (e.g., corporations, departments and others), and there may be a number of computing devices associated with each of client 1 232 and/or client N 234.

Cloud 1 236 and/or cloud 2 238 may span across several geographic regions. In one or more aspects, the aforementioned cloud portions may span multiple countries under differing jurisdictional guidelines. For example, a jurisdictional guideline may deem that a VServer needs to be launched on hardware (e.g., storage system) located in the same jurisdiction as the corresponding client(s).

In one or more aspects, administrators of cloud environment 240 may possess the authority to launch one or more VServers on any of storage system 224A and storage system 224B, irrespective of the location(s) thereof. An administrator may also modify the version of the storage operating system and/or configuration settings on storage system 224A and/or storage system 224B. In another example, an administrator may provision a VServer on a storage system offering lower performance and/or located in a geographic region different from that of a client device.

Figure 3A:
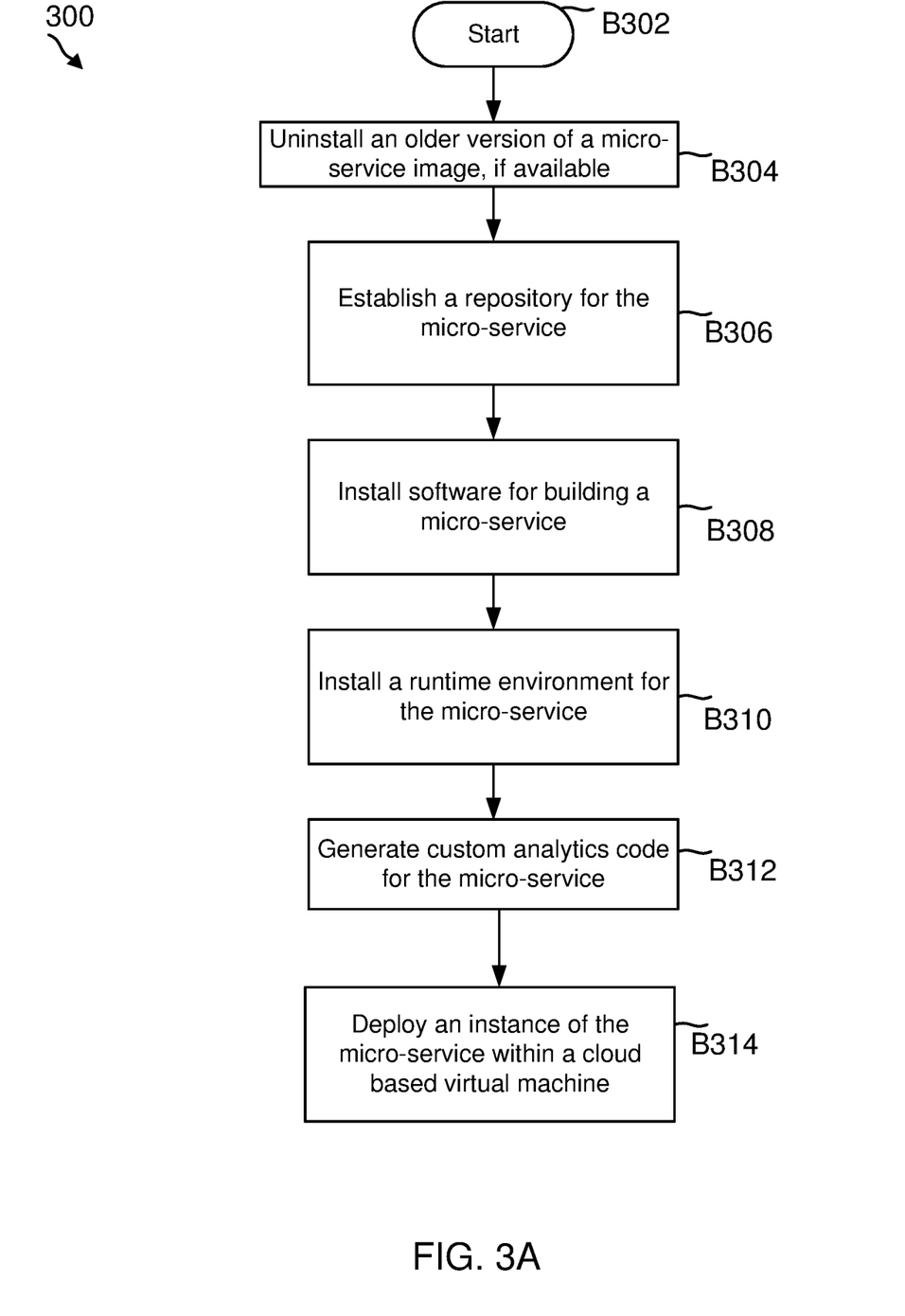
FIG. 3A shows a process for building and deploying a micro-service, according to one aspect of the present disclosure.

Process Flows:

FIG. 3A shows process 300 for building and deploying a micro-service for a networked storage system, according to one aspect of the present disclosure. The process steps of FIG. 3A are executed by a computing device with a network connection and having authorization for initiating the micro-service. The micro-service may be provided to a client system based on client request and needs. As an example, an instance of a virtual machine is built to host a Docker container for providing a micro-service. The virtual machine is then configured for operating an automated deployment script.

Process 300 begins in block B302, after a client request for a micro-service has been received. The client request identifies the type of analytic service that the client desires. For example, the client may seek an analytic service that provides the client with capacity information, latency information, headroom or any other service type related to data stored by the storage systems 108. The adaptive aspects are not limited to any specific service type.

In block BB304, when available, an older version of the micro-service is uninstalled. The older versions may be uninstalled by: "sudo apt-get remove docker docker-engine docker.io."

In block B306, a local repository is established for deploying the micro-service. As an example, the following code may be used for establishing the repository:

```
sudo apt-get
update sudo
apt-get install
\ apt-
transport-https
\ ca-
certificates \
curl \
software-properties-common
curl -fsSL https://download.docker.com/linux/ubuntu/gpg
| sudo apt-key add - sudo apt-key fingerprint 0EBFCD88
sudo add-apt-repository \
"deb [arch=amd64] https://download.docker.com/linux/ubuntu \
$ (lsb_release -cs) \ stable"
```

In block B308, a Docker engine is installed, e.g. the Docker Community Edition ("Docker-CE"). It is noteworthy that the adaptive aspects of the present disclosure may be implemented by other engines.

In block B310, a JavaScript runtime environment is installed. This may be based on Node.JS and can be obtained by:

```
sudo apt-get update
curl -sL https://deb.nodesource.com/setup 6.x
| sudo -E bash - sudo apt-get install nodejs
```

A package manager for the JavaScript environment (e.g. "NPM") is also installed/updated by:

```
sudo npm install -g npm
```

The following commands may be used to update and switch between different JavaScript versions:

```
sudo apt-get update
sudo npm cache clean -f
sudo npm install -g n
sudo n stable
sudo ln -sf /usr/local/n/versions/node/<VERSION>/bin/node /usr/bin/node
```

Any additional software packages for building the micro-service are also installed.

In block B312, data analytic code is generated for the micro-service. The service goals and desired output are defined by user needs. In one aspect, each micro-service uses its own code to obtain data from the data warehouse 146. The code for the data warehouse may be developed using the Bash script. A Hive query for retrieving data from the data warehouse 146 is also created and saved.

In block B314, an instance of a micro-service is created and deployed. The following provides examples for deploying a micro-service after a build operation:

To create docker images after a build, execute the following command:

```
./niq-build docker
```

To deploy to a new instance for a micro-service after the build and for creating a docker image:

```
./niq-build deploy --deploy_target new
```

To deploy to an existing running instance:

```
./niq-build deploy --deploy_target remote
```

To build an individual component of the micro-service:

```
./niq-build build --component ui
```

To run commands:

```
./niq-build build --env production docker deploy -deploy_target new
```

To terminate an instance of the micro-service:

```
./niq-build --terminate
```

It is noteworthy that a client system running the micro-service can clone the repository for executing a template service. After the cloning, a working instance of each component can be run without modification.

Figure 3B:
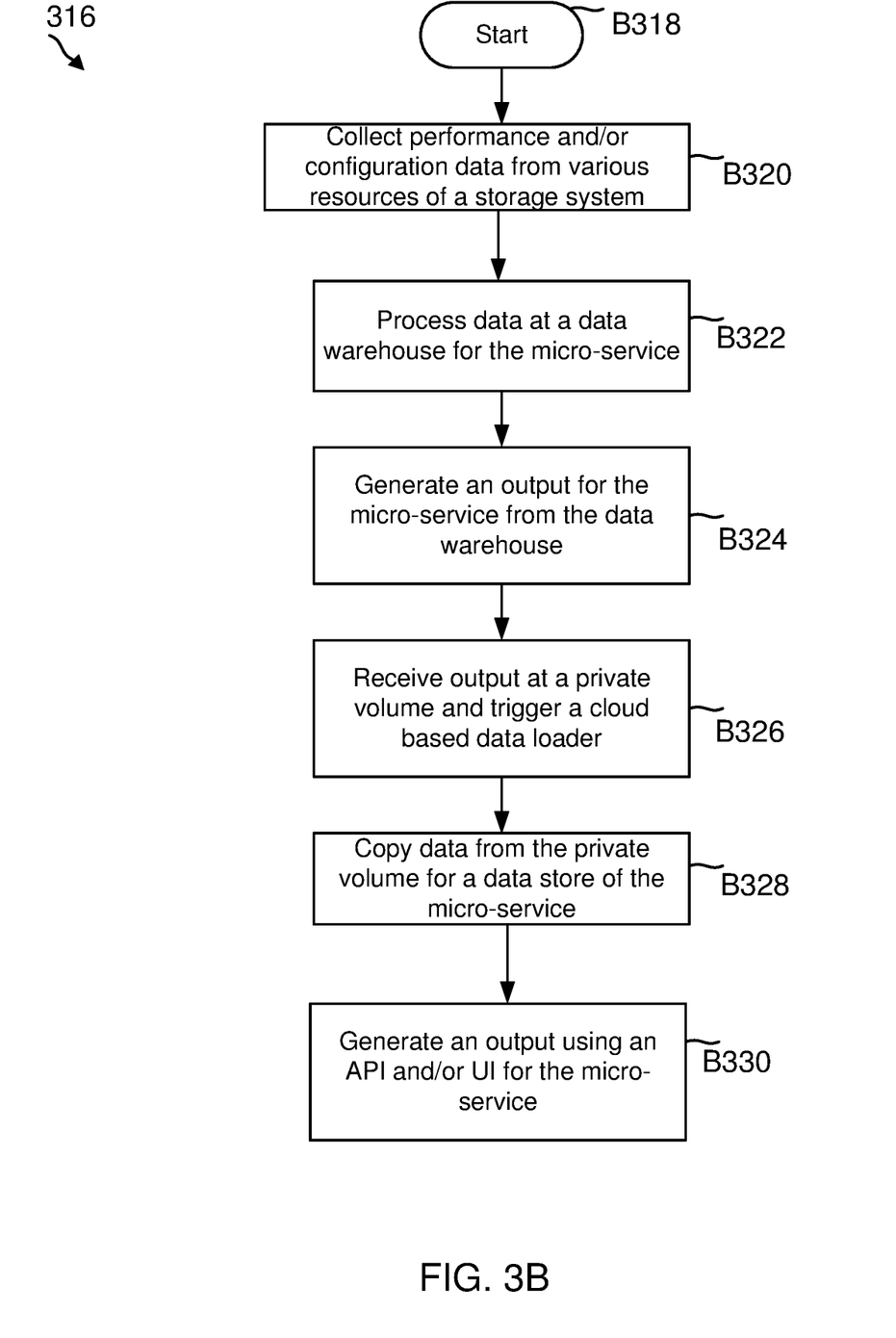
FIG. 3B shows a process for using the micro-service, according to one aspect of the present disclosure.

FIG. 3B shows a process 316 for using a micro-service in a networked storage environment, according to one aspect of the present disclosure. The process begins in block B318, when an instance of a micro-service 130 has been deployed for client use. In block B320, performance and configuration data is selected from various resources of system 100, including aggregates, volumes, network switches, CPUs, storage devices, or any other resource. The data is collected periodically and/or on-demand. The collected data is obtained by the data warehouse 146 and processed in block B322.

In block B324, executing code for the micro-service 130, an output for the micro-service is generated. As described above, this may be implemented by a Hive query.

In block B326, the output from B326 is copied at the private volume 140. This triggers the data loader 138 in cloud 128. In block B328, the data loader 138 copies the data from the private volume to the data store 136 customized for the micro-service 130. Thereafter, in block B330, an output is provided by API 134 and/or UI 132.

Figure 4:
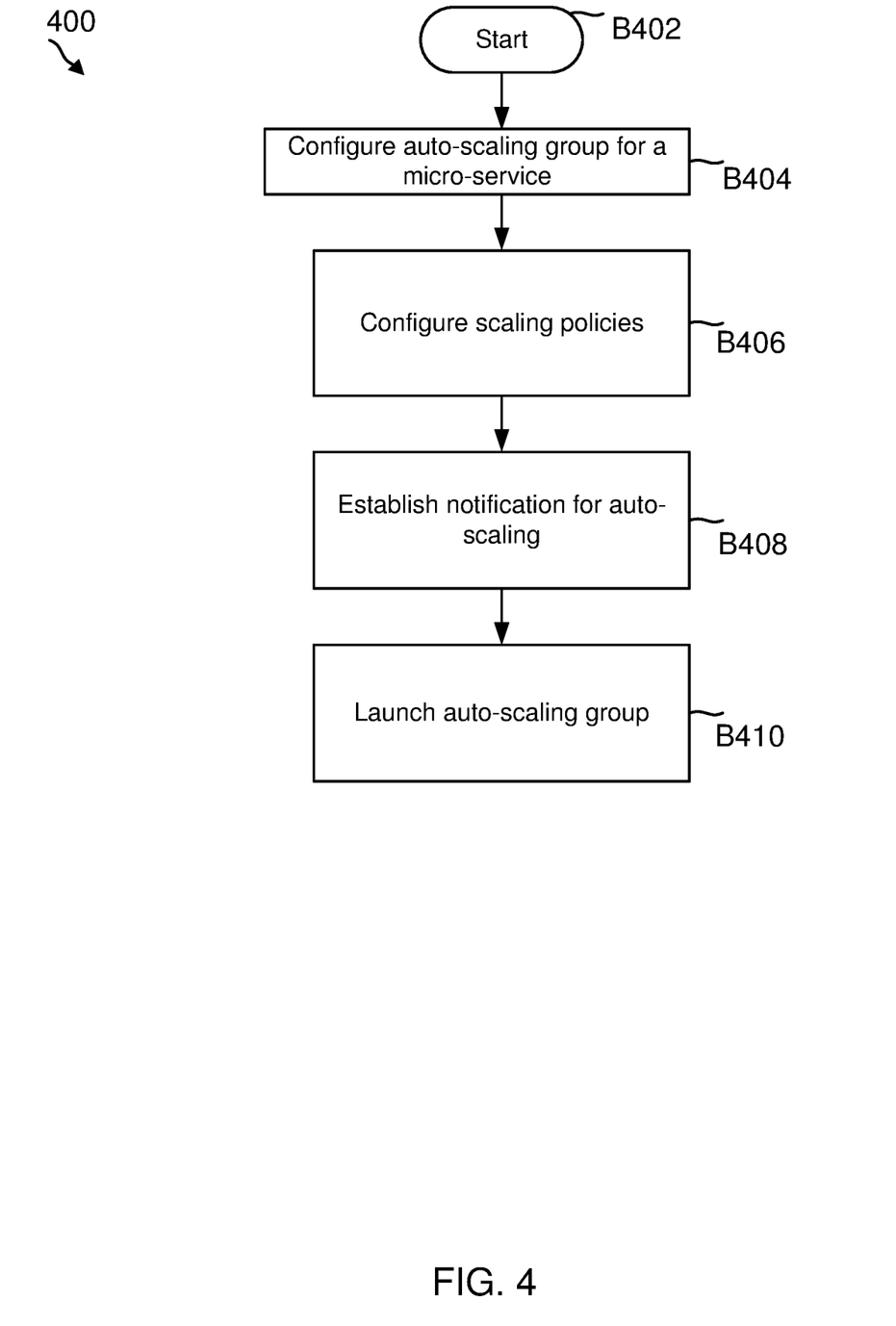
FIG. 4 shows a process for creating an auto-scaling group for micro-services, according to one aspect of the present disclosure.

FIG. 4 shows a process 400 for creating an auto-scaling group for creating multiple instances of a micro-service, according to one aspect of the present disclosure. Process 400 begins in block 402, after a micro-service has been built and deployed using the process flows of FIGS. 3A-3B, respectively.

In block B404, an auto-scaling group is configured. As an example, a group name, size, network and sub-network information for the group is entered. The group details may also include load balancing parameters, monitoring parameters, and other features.

In block B406, scaling policies for the group are set. For example, the scaling policies are used to adjust a capacity for the group. For example, the scaling may be defined by X1 to X16, i.e. from 1 to 16 instances of the micro-services. The scaling policy also defines when a group size is decreased or increased based on pre-defined conditions.

In block B408, notification polices are established for the group. The notification policy defines when to send a notification, e.g. when an instance is launched, terminated, failed to launch or failed to terminate. Thereafter, in block B410, the auto-scaling group is launched.

In one aspect, methods and systems for a networked computing system are provided. One method includes deploying a micro-service associated with data stored by a networked storage system at a storage device, the micro-service deployed as a virtual machine of a cloud-based system having a data store, and an application programming interface (API) for providing analytic information associated with the data and resources of the networked storage system, where the cloud based system is accessible to a client system via a first network connection; processing performance data associated with the micro-service by a first computing system, the performance data collected from the networked storage system; storing the processed performance data for the micro-service at a storage volume accessible to the cloud-based system via a second network connection; triggering a data loader executed by the cloud based system, in response to storing the processed performance data at the storage volume; copying the processed performance data by the data loader at the data store for the micro-service using the second network connection; and providing access to the processed performance data to the client system from the data store via the API and the first network connection.

Figure 5:
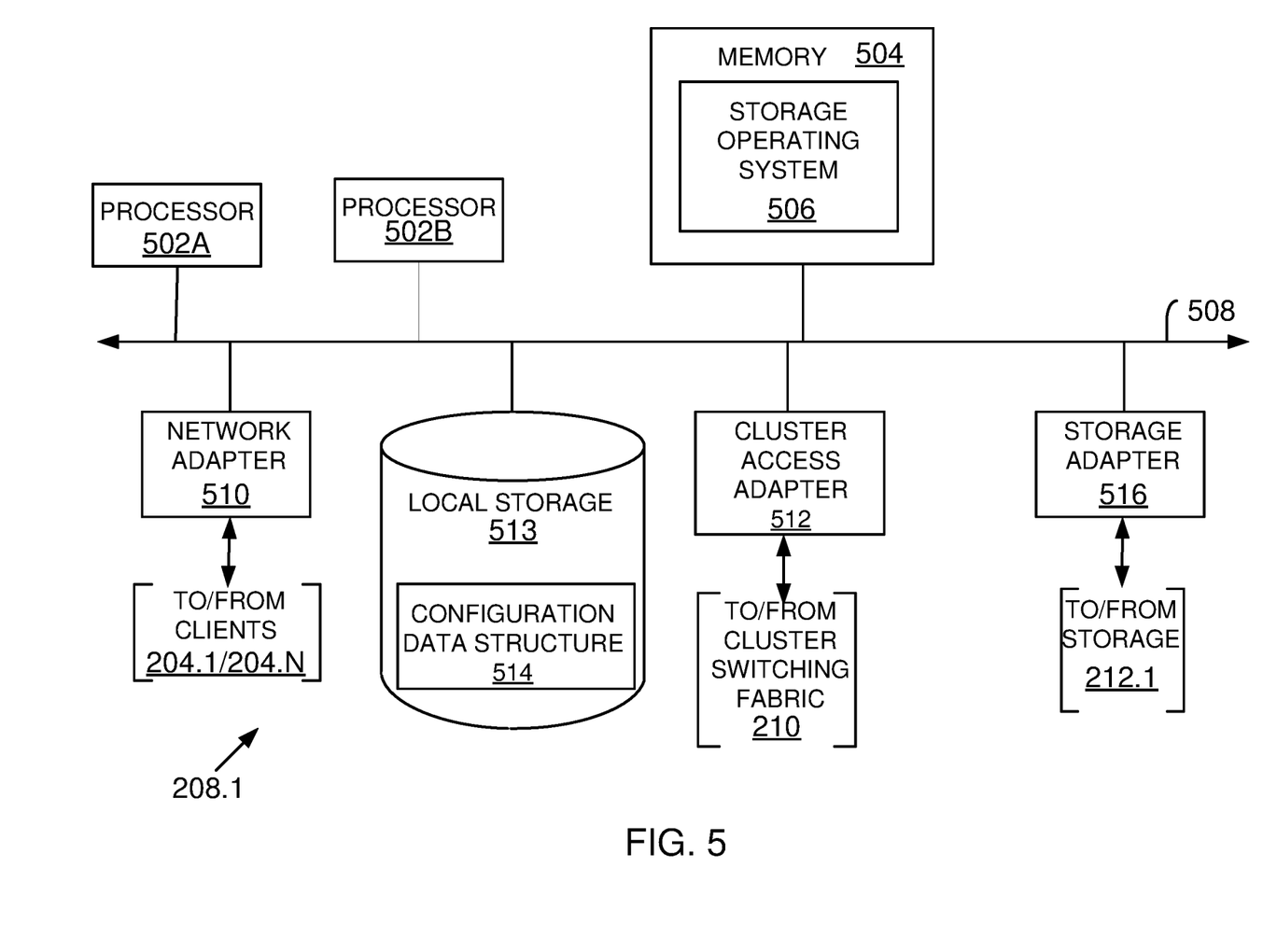
FIG. 5 shows an example of storage system node, used according to one aspect of the present disclosure.

Storage System Node:

FIG. 5 is a block diagram of a node 208.1 that is illustratively embodied as a storage system comprising of a plurality of processors 502A and 502B, a memory 504, a network adapter 510, a cluster access adapter 512, a storage adapter 516 and local storage 513 interconnected by a system bus 508. Node 208.1 may be used to provide information to the management system 118, described above in detail.

Processors 502A-502B may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices. The local storage 513 comprises one or more storage devices utilized by the node to locally store configuration information for example, in a configuration data structure 514.

The cluster access adapter 512 comprises a plurality of ports adapted to couple node 208.1 to other nodes of cluster 100. In the illustrative aspect, Ethernet may be used as the clustering protocol and interconnect media, although it will be apparent to those skilled in the art that other types of protocols and interconnects may be utilized within the cluster architecture described herein. In alternate aspects where the N-modules and D-modules are implemented on separate storage systems or computers, the cluster access adapter 512 is utilized by the N/D-module for communicating with other N/D-modules in the cluster 100.

Each node 208.1 is illustratively embodied as a dual processor storage system executing a storage operating system 506 (similar to 124, FIG. 1) that preferably implements a high-level module, such as a file system, to logically organize the information as a hierarchical structure of named directories and files on storage 212.1. However, it will be apparent to those of ordinary skill in the art that the node 208.1 may alternatively comprise a single or more than two processor systems. Illustratively, one processor 502A executes the functions of the N-module 104 on the node, while the other processor 502B executes the functions of the D-module 106.

The memory 504 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions pertaining to the disclosure described herein.

The storage operating system 506 portions of which is typically resident in memory and executed by the processing elements, functionally organizes the node 208.1 by, inter alia, invoking storage operation in support of the storage service implemented by the node.

The network adapter 510 comprises a plurality of ports adapted to couple the node 208.1 to one or more clients 204.1/204.N over point-to-point links, wide area networks, virtual private networks implemented over a public network (Internet) or a shared local area network. The network adapter 510 thus may comprise the mechanical, electrical and signaling circuitry needed to connect the node to the network. Illustratively, the computer network 206 may be embodied as an Ethernet network or a Fibre Channel network. Each client 204.1/204.N may communicate with the node over network 206 by exchanging discrete frames or packets of data according to pre-defined protocols, such as TCP/IP.

The storage adapter 516 cooperates with the storage operating system 506 executing on the node 208.1 to access information requested by the clients. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on storage device 212.1. The storage adapter 516 comprises a plurality of ports having input/output (I/O) interface circuitry that couples to the storage devices over an I/O interconnect arrangement, such as a conventional high-performance, FC link topology.

Figure 6:
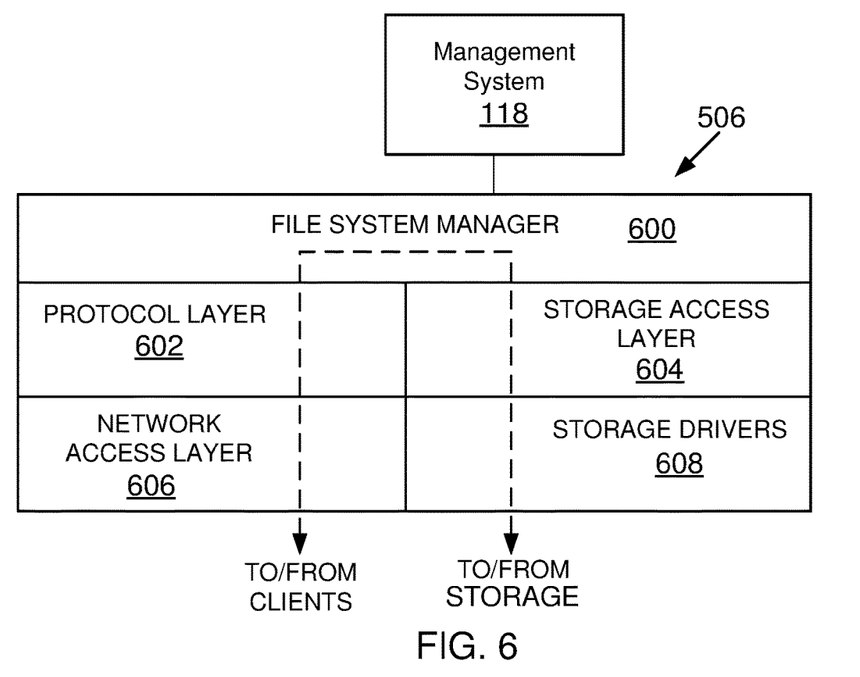
FIG. 6 shows an example of a storage operating system, used according to one aspect of the present disclosure.

Operating System:

FIG. 6 illustrates a generic example of storage operating system 506 (or 124, FIG. 1) executed by node 208.1, according to one aspect of the present disclosure. The storage operating system 506 interfaces with the management system 118 to provide information regarding the data stored by the storage nodes.

In one example, storage operating system 506 may include several modules, or "layers" executed by one or both of N-Module 214 and D-Module 216. These layers include a file system manager 600 that keeps track of a directory structure (hierarchy) of the data stored in storage devices and manages read/write operation, i.e. executes read/write operation on storage in response to client 204.1/204.N requests.

Storage operating system 506 may also include a protocol layer 602 and an associated network access layer 606, to allow node 208.1 to communicate over a network with other systems, such as clients 204.1/204.N. Protocol layer 602 may implement one or more of various higher-level network protocols, such as NFS, CIFS, Hypertext Transfer Protocol (HTTP), TCP/IP and others.

Network access layer 606 may include one or more drivers, which implement one or more lower-level protocols to communicate over the network, such as Ethernet. Interactions between clients' and mass storage devices 212.1-212.3 (or 114) are illustrated schematically as a path, which illustrates the flow of data through storage operating system 506.

The storage operating system 506 may also include a storage access layer 604 and an associated storage driver layer 608 to allow D-module 216 to communicate with a storage device. The storage access layer 604 may implement a higher-level storage protocol, such as RAID (redundant array of inexpensive disks), while the storage driver layer 608 may implement a lower-level storage device access protocol, such as FC or SCSI. The storage driver layer 608 may maintain various data structures (not shown) for storing information regarding storage volume, aggregate and various storage devices.

As used herein, the term "storage operating system" generally refers to the computer-executable code operable on a computer to perform a storage function that manages data access and may, in the case of a node 208.1, implement data access semantics of a general purpose operating system. The storage operating system 506 can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the disclosure described herein may apply to any type of special-purpose (e.g., file server, filer or storage serving appliance) or general-purpose computer, including a stand-alone computer or portion thereof, embodied as or including a storage system. Moreover, the teachings of this disclosure can be adapted to a variety of storage system architectures including, but not limited to, a network-attached storage environment, a storage area network and a storage device directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present disclosure may be utilized with any suitable file system, including a write in place file system.

Figure 7:
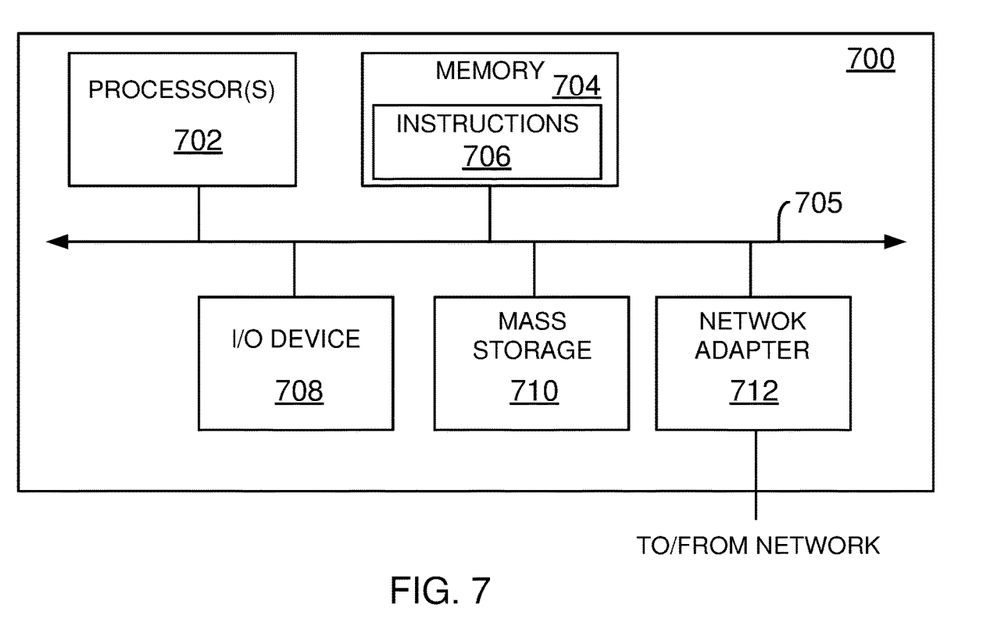
FIG. 7 shows an example of a processing system, used according to one aspect of the present disclosure.

Processing System:

FIG. 7 is a high-level block diagram showing an example of the architecture of a processing system 700 that may be used according to one aspect. The processing system 700 can represent host system 102, management system 118, clients 116, 204, 232 and/or 234, cloud manager 122/220, storage system 108/224A/224B, a cloud based device hosting the micro-services 130. Note that certain standard and well-known components which are not germane to the present aspects are not shown in FIG. 7.

The processing system 700 includes one or more processor(s) 702 and memory 704, coupled to a bus system 705. The bus system 705 shown in FIG. 7 is an abstraction that represents any one or more separate physical buses and/or point-to-point connections, connected by appropriate bridges, adapters and/or controllers. The bus system 705, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor(s) 702 are the central processing units (CPUs) of the processing system 700 and, thus, control its overall operation. In certain aspects, the processors 702 accomplish this by executing software stored in memory 704. A processor 702 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 704 represents any form of random access memory (RAM), read-only memory (ROM), flash memory, or the like, or a combination of such devices. Memory 704 includes the main memory of the processing system 700. Instructions 706 implement the process steps of FIGS. 3A-3B and 4 described above may reside in and execute (by processors 702) from memory 704.

Also connected to the processors 702 through the bus system 705 are one or more internal mass storage devices 710, and a network adapter 712. Internal mass storage devices 710 may be, or may include any conventional medium for storing large volumes of data in a non-volatile manner, such as one or more magnetic or optical based disks. The network adapter 712 provides the processing system 700 with the ability to communicate with remote devices (e.g., storage servers) over a network and may be, for example, an Ethernet adapter, a Fibre Channel adapter, or the like.

The processing system 700 also includes one or more input/output (I/O) devices 708 coupled to the bus system 705. The I/O devices 708 may include, for example, a display device, a keyboard, a mouse, etc.

Thus, a method and apparatus for providing micro-services in a cloud based system have been described. Note that references throughout this specification to "one aspect" (or "embodiment") or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method, comprising:
    deploying a micro-service associated with data stored by a networked storage system at a storage device, the micro-service deployed as a virtual machine of a cloud-based system having a data store, and an application programming interface (API) for providing analytic information associated with the data and resources of the networked storage system;
    wherein the cloud based system is accessible to a client system via a first network connection;
    processing performance data associated with the micro-service by a first computing system, the performance data collected from the networked storage system;
    storing the processed performance data for the micro-service at a storage volume accessible to the cloud-based system via a second network connection;
    triggering a data loader executed by the cloud based system, in response to storing the processed performance data at the storage volume;
    copying the processed performance data by the data loader at the data store for the micro-service using the second network connection; and
    providing access to the processed performance data to the client system from the data store via the API and the first network connection.

2. The method of claim 1, wherein the virtual machine for the micro-service includes a user-interface.

3. The method of claim 2, wherein the API accesses the data store and provides access to the processed performance data via the user interface.

4. The method of claim 1, wherein the micro-service is implemented using multiple instances of the virtual machine.

5. The method of claim 1, wherein the analytic information is based on a parameter defined by the client system.

6. The method of claim 5, wherein an output from the first computing system is based on the parameter.

7. The method of claim 1, wherein the micro-service is part of an auto-scaling group that is configured to increase and decrease a number of instances of the micro-service based on stored configuration policy for the auto-scaling group.

8. A non-transitory machine-readable storage medium having stored thereon instructions for performing a method, comprising machine executable code which when executed by at least one machine, causes the machine to:
    deploy a micro-service associated with data stored by a networked storage system at a storage device, the micro-service deployed as a virtual machine of a cloud-based system having a data store, and an application programming interface (API) for providing analytic information associated with the data and resources of the networked storage system;
    wherein the cloud based system is accessible to a client system via a first network connection;
    process performance data associated with the micro-service by a first computing system, the performance data collected from the networked storage system;
    store the processed performance data for the micro-service at a storage volume accessible to the cloud-based system via a second network connection;
    trigger a data loader executed by the cloud based system, in response to storing the processed performance data at the storage volume;
    copy the processed performance data by the data loader at the data store for the micro-service using the second network connection; and
    provide access to the processed performance data to the client system from the data store via the API and the first network connection.

9. The storage medium of claim 8, wherein the virtual machine for the micro-service includes a user-interface.

10. The storage medium of claim 9, wherein the API accesses the data store and provides access to the processed performance data via the user interface.

11. The storage medium of claim 8, wherein the micro-service is implemented using multiple instances of the virtual machine.

12. The storage medium of claim 8, wherein the analytic information is based on a parameter defined by the client system.

13. The storage medium of claim 12, wherein an output from the first computing system is based on the parameter.

14. The storage medium of claim 8, wherein the micro-service is part of an auto-scaling group that is configured to increase and decrease a number of instances of the micro-service based on stored configuration policy for the auto-scaling group.

15. A system, comprising:
a memory containing machine readable medium comprising machine executable code having stored thereon instructions; and a processor coupled to the memory to execute the machine executable code to:
deploy a micro-service associated with data stored by a networked storage system at a storage device, the micro-service deployed as a virtual machine of a cloud-based system having a data store, and an application programming interface (API) for providing analytic information associated with the data and resources of the networked storage system;
wherein the cloud based system is accessible to a client system via a first network connection;
process performance data associated with the micro-service by a first computing system, the performance data collected from the networked storage system;
store the processed performance data for the micro-service at a storage volume accessible to the cloud-based system via a second network connection;
trigger a data loader executed by the cloud based system, in response to storing the processed performance data at the storage volume;
copy the processed performance data by the data loader at the data store for the micro-service using the second network connection; and
provide access to the processed performance data to the client system from the data store via the API and the first network connection.

16. The of claim 15, wherein the virtual machine for the micro-service includes a user-interface and the API accesses the data store and provides access to the processed performance data via the user interface.

17. The system of claim 15, wherein the micro-service is implemented using multiple instances of the virtual machine.

18. The system of claim 15, wherein the analytic information is based on a parameter defined by the client system.

19. The system of claim 18, wherein an output from the first computing system is based on the parameter.

20. The system of claim 15, wherein the micro-service is part of an auto-scaling group that is configured to increase and decrease a number of instances of the micro-service based on stored configuration policy for the auto-scaling group.

* * * * *